US007492557B2

(12) United States Patent
Noguchi et al.

(10) Patent No.: US 7,492,557 B2

(45) Date of Patent: Feb. 17, 2009

(54) SWITCHING DEVICE AND ELECTRIC APPARATUS

(75) Inventors: Yukio Noguchi, Kanagawa (JP); Akihiro Gotoh, Kanagawa (JP)

(73) Assignees: Ricoh Company, Ltd., Tokyo (JP); HST Co., Ltd., Tokyo (JP)

( * ) Notice: Subject to any disclaimer, the term of this patent is extended or adjusted under 35 U.S.C. 154(b) by 457 days.

(21) Appl. No.: 11/125,372

(22) Filed: May 10, 2005

(65) Prior Publication Data

US 2005/0275995 A1 Dec. 15, 2005

(30) Foreign Application Priority Data

May 11, 2004 (JP) ............................ 2004-141245
Feb. 14, 2005 (JP) ............................ 2005-036998

(51) Int. Cl.
*H02H 3/00* (2006.01)

(52) U.S. Cl. ........................................ 361/42; 361/160

(58) Field of Classification Search ................. 361/160, 361/170, 139, 142, 147, 42–50, 115; 335/177, 335/179, 229–234, 14

See application file for complete search history.

(56) References Cited

U.S. PATENT DOCUMENTS

| | | | | |
|---|---|---|---|---|
| 27,557 | A * | 3/1860 | Lian | 415/146 |
| 3,708,723 | A * | 1/1973 | Shand et al. | 361/90 |
| 3,780,348 | A * | 12/1973 | Loukidis | 361/45 |
| 3,914,723 | A * | 10/1975 | Goodbar | 335/79 |
| 4,080,640 | A * | 3/1978 | Elms et al. | 361/45 |
| 4,320,433 | A * | 3/1982 | Yamaki | 361/45 |
| 5,023,467 | A * | 6/1991 | Uhl | 307/10.1 |
| 5,231,309 | A * | 7/1993 | Soma et al. | 307/125 |
| 5,248,951 | A * | 9/1993 | Sogabe et al. | 335/14 |
| 5,978,191 | A * | 11/1999 | Bonniau et al. | 361/45 |
| 6,768,626 | B1 * | 7/2004 | Hemmer | 361/139 |

FOREIGN PATENT DOCUMENTS

| | | |
|---|---|---|
| JP | 5-334953 | 12/1993 |
| JP | 11-299082 | 10/1999 |
| JP | 2000-261953 | 9/2000 |
| JP | 2001-6515 | 1/2001 |
| JP | 2001-23501 | 1/2001 |

* cited by examiner

*Primary Examiner*—Michael J Sherry
*Assistant Examiner*—Terrence R Willoughby
(74) *Attorney, Agent, or Firm*—Oblon, Spivak, McClelland, Maier & Neustadt, P.C.

(57) ABSTRACT

A switching device is provided that includes a switching mechanism unit and a switch drive control circuit. In the switching device, an operating member is maintained in an ON position by the sucking force of a permanent magnet and a yoke, despite the pushing force of a biasing unit, when the permanent magnet is in an ON position. The yoke is magnetized in such a manner as to reduce the magnetic force of the permanent magnet, when a coil wound around the yoke is energized by the switch drive control unit. The operating member and a switching member are moved from the ON position to the OFF position by virtue of the pushing force of the biasing unit, thereby shutting a feed line.

8 Claims, 11 Drawing Sheets

SWITCHING DEVICE AND ELECTRIC APPARATUS

BACKGROUND OF THE INVENTION

1. Field of the Invention

The present invention relates to a switching device, and, more particularly, to a switching device that is easy to operate and is so small as to be disposed in the housing of an electric apparatus such as a copying machine, a printer, or a personal computer, and can be used for at least either leakage prevention or excess voltage prevention. The present invention also relates to such an electric apparatus.

2. Description of the Related Art

There have been ground-fault interrupters as domestic wiring devices for detecting and shutting off leakage in domestic wirings (see Japanese Laid-Open Patent Application Nos. 2000-261953, 2001-023501, and 2001-006515). The structures and forms of the conventional ground-fault interrupters are standardized in accordance with the JIS (Japanese Industrial Standards), and the necessary components are housed in standardized housings.

For example, the ground-fault interrupter that is disclosed in Japanese Laid-Open Patent Application No. 5-334953 has a housing that is formed with a main casing and a main cover. This housing contains a zero phase current transformer and an overcurrent transformer that detects leakage and overcurrent in the main circuit, an open-close mechanism unit that opens and closes the main circuit, trip coils that drive the open-close mechanism unit, and the like. One of the trip coils is employed to eliminate leakage, while the other one of the trip coils is employed to eliminate overcurrent. Further, a leakage display device that displays each occasion of leakage elimination in conjunction with the trip coil for eliminating leakage is disposed in the housing in such a manner that each occasion of leakage elimination can be recognized through the housing. In this manner, this ground-fault interrupter has a closed structure.

In such a conventional ground-fault interrupter, the open-close mechanism unit that opens and closes the main circuit is opened by the trip coils, and is closed through a handle that is manually operated after leakage or overcurrent is eliminated. However, priority is put on the opening operation with the trip coils, and the open-close mechanism unit is designed to be accommodated in the housing.

Japanese Laid-Open Patent Application No. 11-299082 discloses a ground-fault interrupter device that includes not only a leakage detector and an excess voltage detector, but also a means of releasing a load from the power source based on the output of either of the leakage detector and the excess voltage detector. With this ground-fault interrupter device, a load can be released from the power source not only when there is leakage but also when excess voltage is detected. Thus, load damage due to abnormal voltage or excess voltage can be prevented.

In each of the above conventional ground-fault interrupters, however, all the necessary components are contained in the housing standardized as a domestic wiring device in accordance with the JIS. Therefore, in a case where such a ground-fault interrupter is employed in an electric apparatus such as a copying machine, a printer, or a personal computer, it is difficult to secure a sufficient ground space in the apparatus. If a sufficient ground space is secured, the apparatus becomes large in size.

Also, the ground-fault interrupter disclosed in Japanese Laid-Open Patent Application No. 5-334953 has the function of detecting leakage and the function of detecting overcurrent. The components that execute those functions are accommodated in the JIS housing, and are hermetically closed by the housing. As a result, the inner structure becomes complicated, and the product becomes expensive. In a case where a ground-fault interrupter having such a housing is disposed in an apparatus, there are two housings existing in one structure. Due to heat generation from the inner components, the temperature in the housing of the ground-fault interrupter becomes higher, resulting in a decrease in detection accuracy.

Further, since the open-close mechanism unit has priority on the opening operation with the trip coils and is designed to be contained in a housing, the handle to open the main circuit of the open-close mechanism unit is not lightly moved, resulting in poor operability and usability.

As for the ground-fault interrupter device disclosed in Japanese Laid-Open Patent Application No. 11-299082, the control circuit is not protected, because operating current is supplied to the control circuit even after the load is released from the power source. Even if excess voltage is detected, the excess voltage is supplied to the control circuit. Further, in this structure, a short-circuit relay is constantly used. In a case where the excess voltage is not eliminated when the main power supply is switched back on, a shutoff operation needs to be performed again. The repetitive shutoff operation might have adverse influence on the load.

Also, as a smoothing capacitor is used to monitor excess voltage so as to increase the detection accuracy, there is a decrease in the accuracy of impulse excess voltage detection. Since the operating power is supplied separately to the leakage detector and the excess voltage detector, a large quantity of standby power is required.

SUMMARY OF THE INVENTION

A general object of the present invention is to provide a switching device and an electric apparatus in which the above disadvantages are eliminated.

A more specific object of the present invention is to provide a switching device with which an ON operation can be performed very easily, and an OFF operation can be automatically performed with an electric signal based on a leakage detection signal or the like. With this switching device, excellent operability and workability can be realized, while a stable switching operation is constantly performed. The present invention is also to provide an electric apparatus that is equipped with the switching device.

Other specific objects of the present invention are to protect the control circuit of the switching device by shutting off the power supply to a load when leakage or excess voltage is generated in an electric apparatus, to prevent a repetitive shutting operation of the switching device due to inadvertent resumption of power supply, to increase the accuracy of leakage and excess voltage detection, and to save standby energy.

The above objects of the present invention are achieved by a switching device that includes: a switching mechanism unit that includes: a yoke around which a coil is wound; a permanent magnet that is movable between an ON position that is in contact with or in the vicinity of the yoke and an OFF position that is at a predetermined distance from the yoke; an operating member that moves to an ON position or an OFF position, as the permanent magnet moves to the ON position or the OFF position; a switching member that connects or shuts a predetermined feed line, as the operating member moves to the ON position or the OFF position; and a biasing unit that pushes the operating member toward the OFF position; and a switch drive control unit that controls energization of the coil that is wound around the yoke.

In this switching device, the operating member is maintained in the ON position by virtue of the sucking force of the permanent magnet and the yoke, despite the pushing force of the biasing unit, when the permanent magnet is in the ON position. The yoke is magnetized in such a manner as to reduce the magnetic force of the permanent magnet, when the coil is energized by the switch drive control unit. The operating member and the switching member are moved from the ON position to the OFF position by virtue of the pushing force of the biasing unit, thereby shutting the feed line.

In the switching device, the switch drive control unit may include at least a leakage detecting unit that determines whether there is leakage due to the feed line or a load that is fed via the feed line. When the leakage detecting unit determines that there is leakage, the switch drive control unit energizes the coil so as to shut the feed line.

Alternatively, the switch drive control unit may include an excess voltage determining unit that monitors input voltage of the feed line and determines whether there is excess voltage based on a predetermined criterion. When the excess voltage determining unit determines that there is excess voltage, the switch drive control unit energizes the coil so as to shut the feed line.

More preferably, the switch drive control unit includes both the leakage detecting unit and the excess voltage determining unit. When leakage or excess voltage is detected, the switch drive control unit energizes the coil so as to shut the feed line.

In such a case, the leakage determining circuit of the leakage detecting unit and the excess voltage determining circuit of the excess voltage determining unit may be disposed in a module of an integral control block.

In this switching device, the excess voltage determining unit preferably performs an excess voltage determining operation on a shorter cycle than a ¼ cycle of the input voltage of the feed line, when the input voltage is alternating voltage.

In this switching device, the switching mechanism unit and the switch drive control unit are preferably disposed on the same surface of a predetermined substrate.

More preferably, the switching mechanism unit is detachably attached onto the substrate.

The above objects of the present invention are also achieved by an electric apparatus that includes the above described switching device. In this electric apparatus, an external power supply introducing outlet is formed on the housing of the electric apparatus. A device power supply unit is provided to generate operating power from the power supplied from an external power source, and to supply the operating power to various internal circuits. The power supply line between the external power supply introducing outlet and the device power supply unit serves as the feed line. The switching mechanism unit is disposed on the power supply line. The switch drive control unit includes at least a leakage detecting unit that determines whether there is leakage due to the feed line or a load that is fed via the feed line. The switch drive control unit energizes the coil so as to shut the feed line, when the leakage detecting unit detects leakage.

In the above electric apparatus, the switch drive control unit may include an excess voltage determining unit that monitors input voltage of the feed line and determines whether there is excess voltage based on a predetermined criterion. The switch drive control unit energizes the coil so as to shut the feed line, when the excess voltage determining unit determines that there is excess voltage.

The switch device control unit may include both the leakage detecting unit and the excess voltage determining unit. When leakage or excess voltage is detected, the switch drive control unit energizes the coil so as to shut the feed line.

In such a case, the leakage determining circuit of the leakage detecting unit and the excess voltage determining circuit of the excess voltage determining unit may be disposed in a module of an integral control block.

In the above electric apparatus, the excess voltage determining unit of the switching device preferably performs an excess voltage determining operation on a shorter cycle than a ¼ cycle of the input voltage of the feed line, when the input voltage is alternating voltage.

The operating power of the switch drive control unit of the switching device is preferably supplied through the power supply line on a downstream side of the leakage detecting unit.

The switching mechanism and the switch drive control unit of the switching device are preferably disposed on the same surface of a predetermined substrate.

More preferably, the switching mechanism unit of the switching device is detachably attached onto the substrate.

In a switching device in accordance with the present invention, the operating member that moves the switching member, which connects or shuts the feed line, between the ON position and the OFF position is pushed toward the OFF position by the biasing unit. The permanent magnet that moves the operating member between the ON position and the OFF position is maintained in the ON position by virtue of its magnetic force. In the ON position, the permanent magnet is in tight contact with or in the vicinity of the yoke around which the coil is wound. As the coil wound around the yoke is energized, the magnetic force of the permanent magnet is reduced, and the operating member and the switching member are moved from the ON position to the OFF position by virtue of the pushing force of the biasing unit, so that the feed line is shut off. As the operating member is moved in the ON direction, the suction force works between the permanent magnet and the yoke. Accordingly, the ON operation can be performed with small operating force, and the OFF operation can be surely performed with an electric signal. Thus, higher operability and usability can be achieved, while a stale switching operation is constantly performed.

When leakage from the feed like is detected or excess voltage is detected in input voltage, the coil is energized so as to shut off the feeding circuit automatically. Thus, great safety can be maintained. Also, the shutoff operation is not to be repeated.

In an electric apparatus equipped with the above switching device, such as a printer, a copying machine, or a personal computer, the switching mechanism unit is disposed on the power supply line between the external power introducing outlet of the housing and the power supply unit of the apparatus. The switch drive control unit of the switching device includes the leakage detecting unit or the excess voltage determining unit. Accordingly, at least either leakage or excess voltage (abnormal voltage) in the apparatus is detected, and the power source can be surely shut off. Thus, greater safety can be provided to the apparatus. Furthermore, the ON operation at the time of recovery can be readily performed with small operating force.

The operating power source of the switch drive control unit is supplied from the power supply line on the downstream side of at least the leakage detecting unit. With this arrangement, leakage detection and power supply from the outside can be both controlled. Thus, greater safety can be provided, and higher usability can be achieved.

The switching mechanism unit and the switch drive control unit are disposed on the same surface of the predetermined substrate, so that the switching device can be made smaller and higher productivity can be achieved.

The switching mechanism unit is detachably mounted onto the substrate, so that the switching mechanism unit can be easily replaced with a new one. Thus, maintenance of the switching device can be readily done.

The above and other objects, features, and advantages of the present invention will become more apparent from the following detailed description taken in conjunction with the accompanying drawings.

DESCRIPTION OF THE PREFERRED EMBODIMENTS

The following is a description of embodiments of the present invention, with reference to the accompanying drawings. As the embodiments described below are preferred embodiments of the present invention, various restrictions are put on them in terms of technical features. However, the scope of the present invention is not limited to those embodiments, unless otherwise mentioned.

First Embodiment

Figure 1:
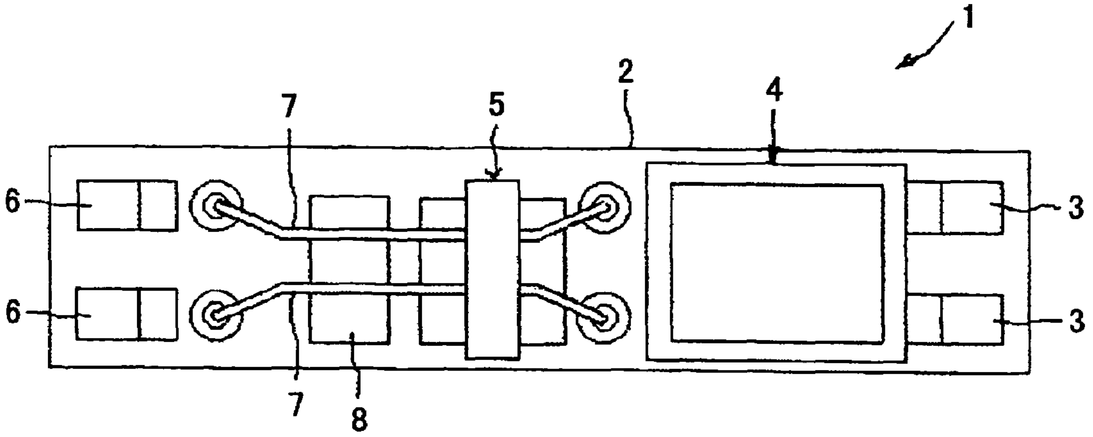
FIG. 1 is a plan view of a first embodiment of a switching device in accordance with the present invention.
Figure 2:
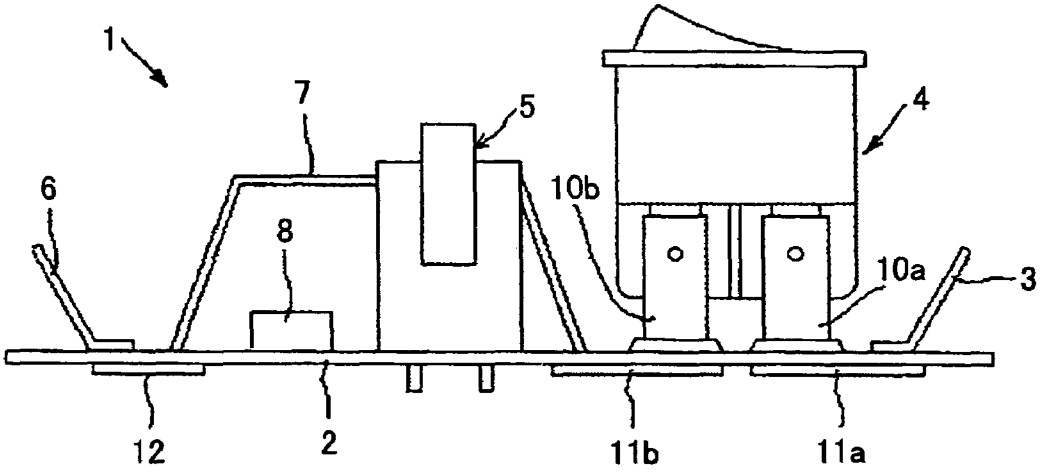
FIG. 2 is a front view of the first embodiment of a switching device.
Figure 3:
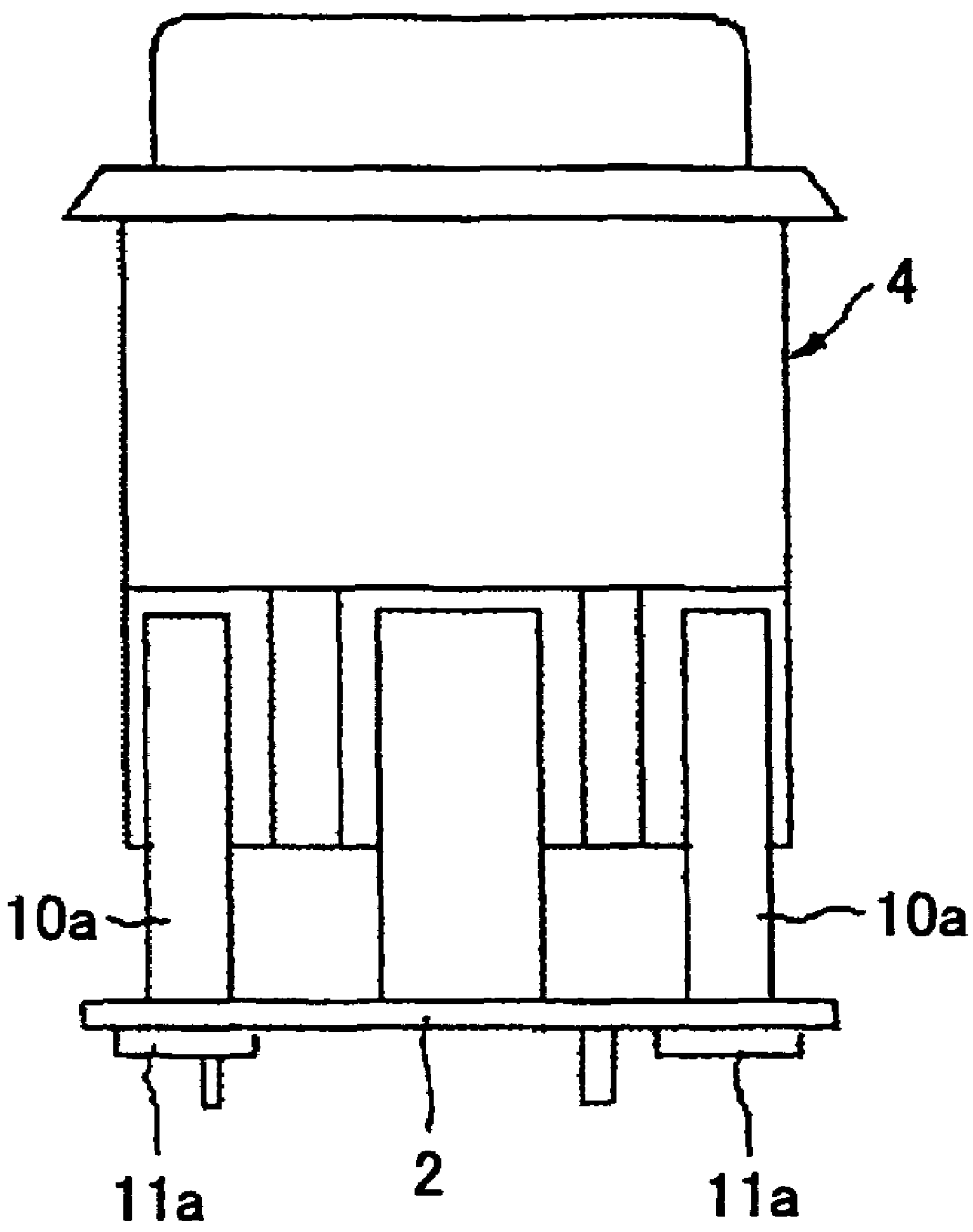
FIG. 3 is an enlarged right side view of the switching mechanism unit shown in FIGS. 1 and 2.
Figure 4:
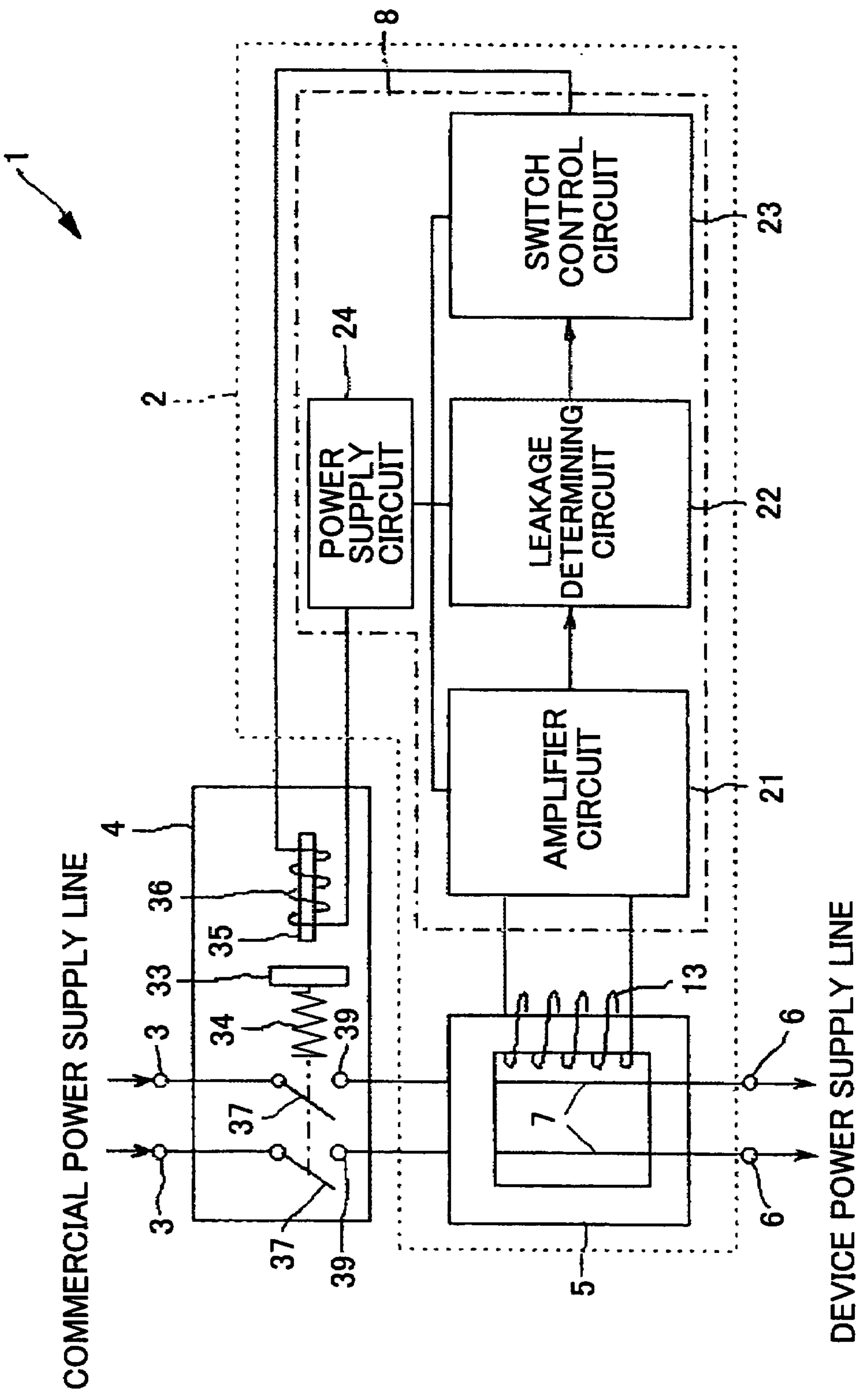
FIG. 4 is a circuit diagram of the switching device shown in FIGS. 1 and 2.

A first embodiment of a switching device and electric equipment in accordance with the present invention is described. FIGS. 1 through 8 illustrate the first embodiment of a switching device in accordance with the present invention. FIG. 1 is a plan view of the switching device. FIG. 2 is a front view of the switching device. FIG. 3 is an enlarged right side view of the switching mechanism of the switching device. FIG. 4 is a circuit diagram of the switching device. FIGS. 5 through 8 are enlarged front views illustrating the operation of the switching device, showing various states of the switching mechanism. FIG. 9 is a perspective rear view of a printer that is an example of electric equipment to which the switching device is applied.

As shown in FIGS. 1 and 2, the switching device 1 of the first embodiment includes a pair of input connecting terminals 3, a switching mechanism unit 4, a leakage detecting current transformer 5, a pair of output connecting terminals 6, two electric cable members 7 that form feed lines, and a switch drive control circuit 8. These components are disposed on the same surface of a substrate 2. A housing or the like is not employed to house the input connecting terminals 3, the switching mechanism unit 4, the leakage detecting current transformer 5, the output connecting terminals 6, the electric cable members 7, and the switch drive control circuit 8.

This switching device 1 is provided within a main housing 101 of a printer as electric equipment as shown in FIG. 9, for example. In the main housing 101, the switching device 1 is not covered with a housing or the like, as described above, but is left open. Although not shown, this printer 100 operates with a commercial power supply of 100 V that is supplied from the outside via a power supply cable, and records an image on a recording paper sheet based on input image data by an electrophotographic technique. Electric equipment to which a switching device in accordance with the present invention is not limited to a printer, but a switching device in accordance with the present invention may be applied to various types of electric apparatuses including image forming apparatuses such as copying machines and facsimile machines, and information processing devices such as personal computers.

More specifically, the switching device 1 has the input connecting terminals 3 provided at one end of the rectangular-shaped substrate 2. The input connecting terminals 3 are connected to an external power supply introducing outlet through which the power supply cable for supplying the commercial external power supply of 100 V is introduced.

The switching mechanism unit 4 is detachably attached onto the substrate 2 via fixed terminals 10*a* and 10*b* (see FIGS. 2 and 3) mounted to the substrate 2. A connecting piece 11*a* for connecting the input connecting terminals 3 to the input-side fixed terminal 10*a* of the switching mechanism unit 4 is formed on the bottom surface of the substrate 2. A connecting piece 11*b* for connecting the output-side fixed terminal 10*b* of the switching mechanism unit 4 to the electric cable members 7 is also formed on the bottom surface of the substrate 2.

The two electric cable members 7 penetrate the inside of the leakage detecting current transformer 5, and are connected to the pair of output connecting terminals 6 via a connecting piece 12 formed on the bottom surface of the substrate 2. The output connecting terminals 6 are connected to the power source lines connected to the power supply unit (PSU) or the like (not shown) of the printer 100.

Accordingly, in this switching device 1, the commercial external supply power of 100 V flows in the order of input connecting terminals 3, the connecting piece 11*a*, the fixed terminal 10*a*, the switching mechanism unit 4, the fixed terminal 10*b*, the connecting piece 11*b*, the electric cable members 7 penetrating the leakage detecting current transformer 5, the connecting piece 12, and the output connecting terminals 6. The supply power flowing through the switching device 1 is supplied to the power supply unit of the printer 100 via the power supply line connected to the output connecting terminals 6.

The leakage detecting current transformer 5 detects unbalanced AC power flowing through the electric cable members 7 that penetrate the transformer 5. As shown in FIG. 4, a secondary coil 13 is wound around the leakage detecting current transformer 5. When leakage of the power flowing through the electric cable members 7 is caused, unbalanced voltage is induced, and voltage is generated in the secondary coil 13 due to the unbalanced voltage.

As shown in FIG. 4, the switch drive control circuit 8 includes an amplifier circuit 21, a leakage determining circuit 22, a switch control circuit 23, and a power supply circuit 24. The power supply circuit 24 is provided with AC power from the power supply line closer to the downstream side of the power supply than to the leakage detecting current transformer 5, for example, from the output connecting terminals 6. The AC is rectified and the voltage is adjusted, so that the necessary power supply is provided to the amplifier circuit 21, the leakage determining circuit 22, and the switch control circuit 23. Also, the operating power is supplied to the switch mechanism unit 4.

The secondary coil 13 wound around the leakage detecting current transformer 5 is connected to the amplifier circuit 21. When there is leakage, the voltage generated in the secondary coil 13 is input as leakage detecting voltage. The amplifier circuit 21 then amplifies the leakage detecting voltage detected by the secondary coil 13, and outputs it to the leakage determining circuit 22.

The leakage determining circuit 22 compares the leakage detecting voltage input from the amplifier circuit 21 with a preset comparative voltage, thereby determining whether the leakage exceeds a predetermined leakage level. If the leakage exceeds the predetermined leakage level, the leakage determining circuit 22 outputs a leakage detection signal to the switch control circuit 23.

Accordingly, the leakage detecting current transformer 5 that is equipped with the secondary coil 13, the amplifier circuit 21, and the leakage determining circuit 22 collectively function as a leakage detecting unit. Also, the leakage detecting current transformer 5 and the switch drive control circuit 8 form a switch drive controlling unit.

The switch control circuit 23 of the switch drive control circuit 8 normally shuts off the supply of opening power from the power supply circuit 24 to the switching mechanism unit 4, so that the switching mechanism unit 4 closes the power supply line and the power supply unit of the printer 100 is provided with power from an external power source. As a leakage detection signal is input from the leakage determining circuit 22, the supply of opening power is resumed from the power supply circuit 24 to the switching mechanism unit 4, so that the switching mechanism unit 4 opens the power supply line and the power supply from an external power source to any component beyond the switching mechanism unit 4 is cut off.

Figure 5:
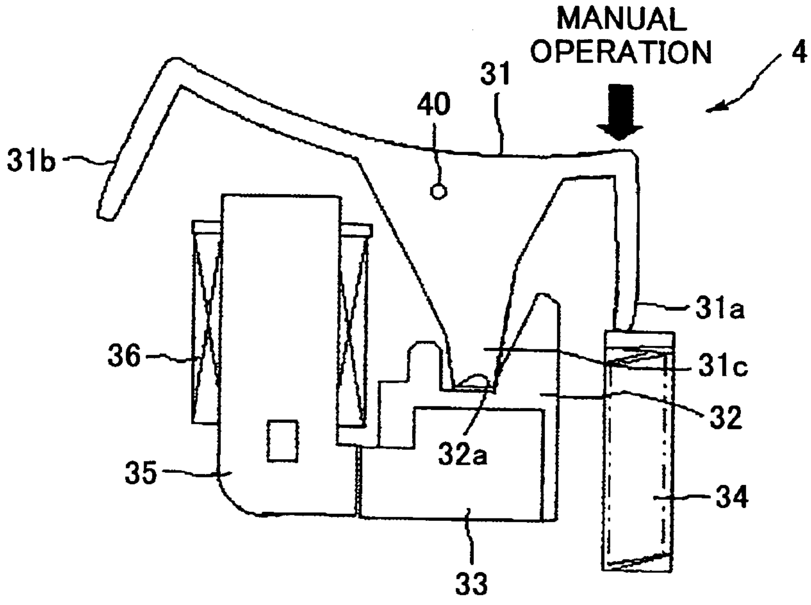
FIG. 5 is an enlarged front view of the swing handle operating portion, illustrating the switching mechanism unit in an ON state.
Figure 6:
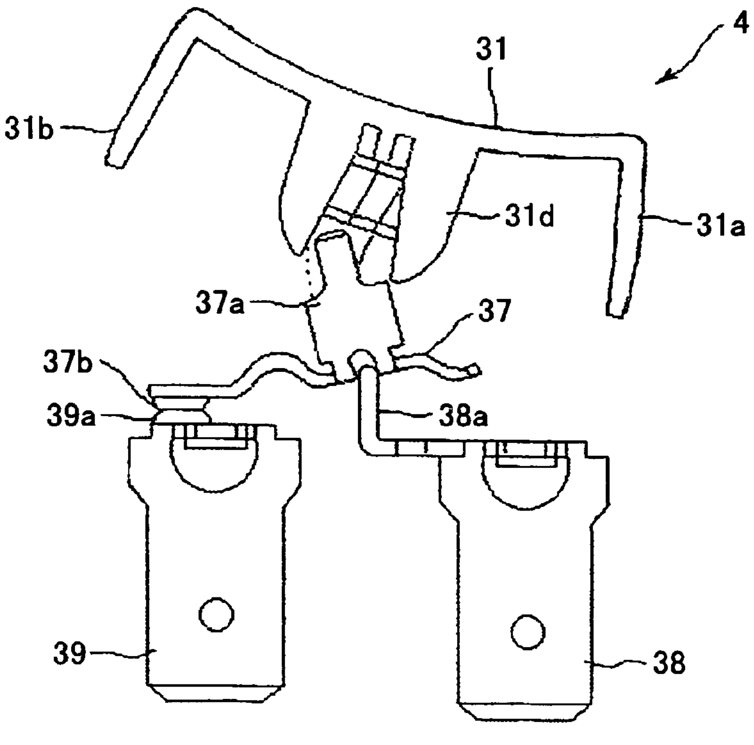
FIG. 6 is an enlarged front view of the switching mechanism portion, illustrating the switching mechanism unit in an ON state.
Figure 7:
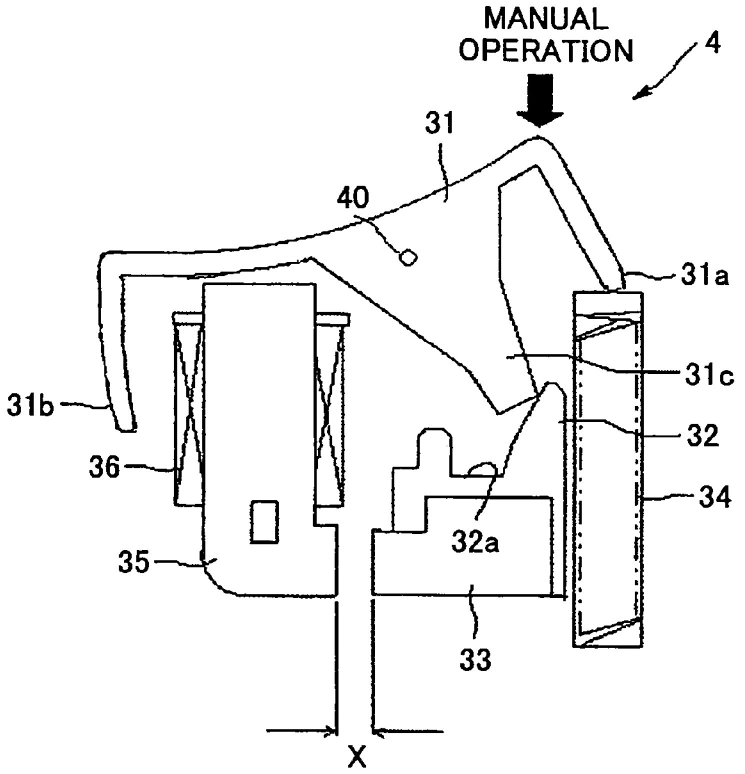
FIG. 7 is an enlarged front view of the swing handle operating portion, illustrating the switching mechanism unit in an OFF state.
Figure 8:
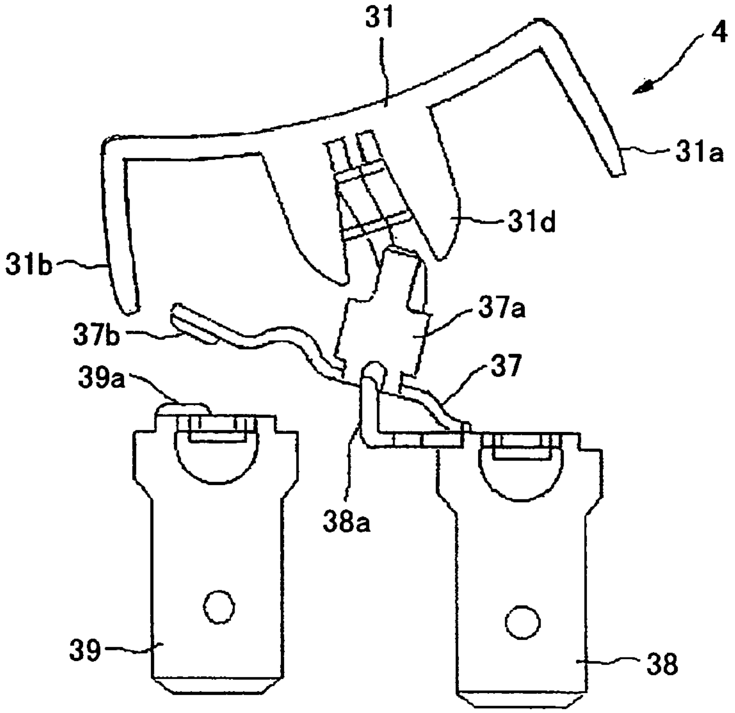
FIG. 8 is an enlarged front view of the switching mechanism portion, illustrating the switching mechanism unit in an OFF state.
Figure 9:
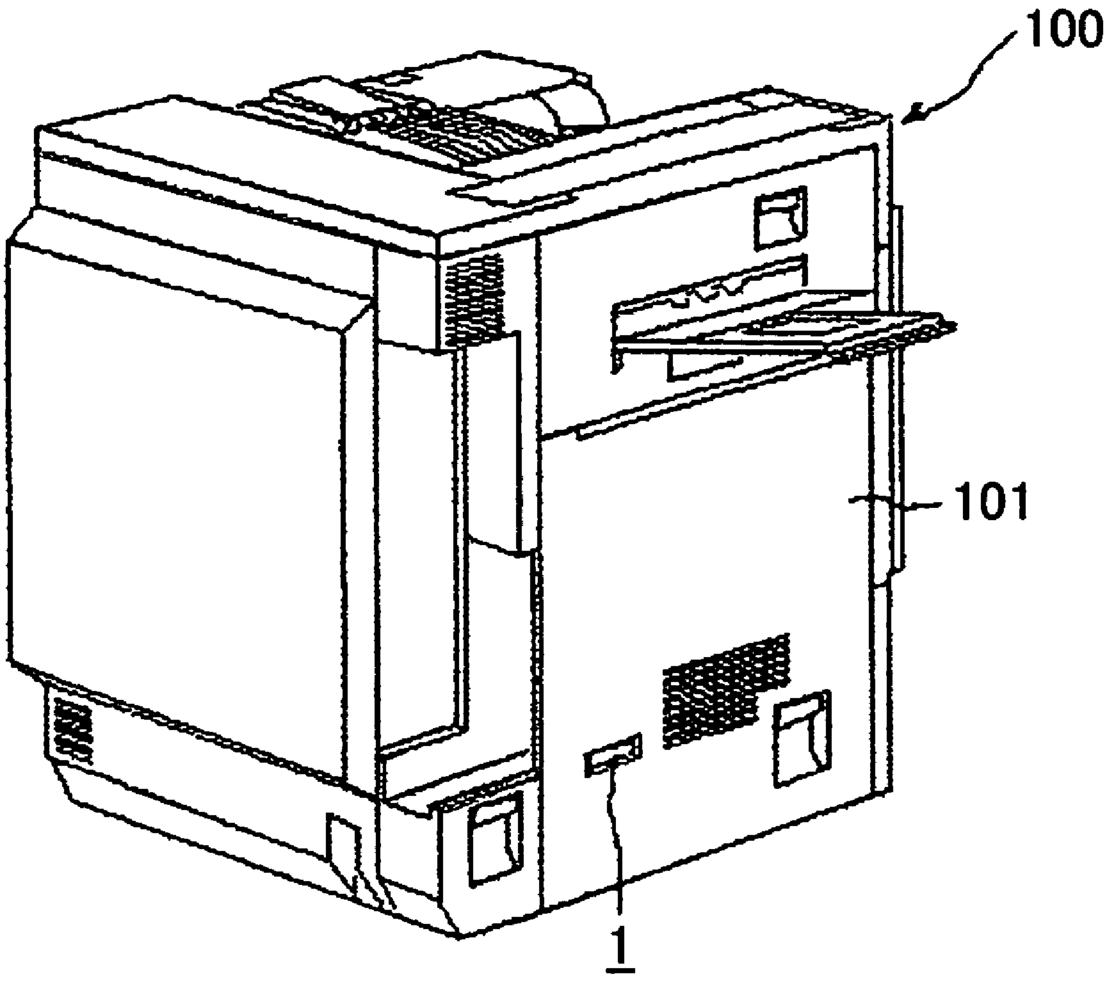
FIG. 9 is a rear perspective view of a printer to which a switching device of the present invention is applied.

The structure of the switching mechanism unit 4 in an ON state is shown in FIGS. 5 and 6, and the structure of the switching mechanism unit 4 in an OFF state is shown in FIGS. 7 and 8. As shown in these drawings, the switching mechanism unit 4 includes a swing handle 31 that is an operating member, a slide arm 32, a permanent magnet 33, a return spring 34 that is a biasing member, a yoke 35, a coil 36 that is wound around the yoke 35, a switching member 37, an input-side fixed contact member 38, and an output-side fixed contact member 39.

The swing handle 31 that is an operating member has arms 31*a* and 31*b* that extend downward from the end portions. A restricting protrusion 31*c* that protrudes downward is formed at the center of the swing handle 31. The swing handle 31 is movably supported by a shaft 40, with the upper middle portion of the restricting protrusion 31*c* being the center of the swing movement. As shown in FIG. 5, in an ON state, the swing handle 31 has the arm 31*a* tilting downward. As shown in FIG. 7, in an OFF state, the swing handle 31 has the arm 31*b* tilting downward. In an ON state, the tilting handle 31 has the top end of the arm 31*a* pushes the return string (the biasing means) 34. With the spring pressure of the return spring 34, the swing handle 31 swings counterclockwise or swings in the off direction.

In this state, the swing handle 31 has the top end of the restricting protrusion 31*c* inserted into a concave portion 32*a* formed in the slide arm 32. The concave portion 32*a* of the slide arm 32 is formed on the tilted wall surface that is formed by tilting the right side wall surface by a predetermined angle, as shown in FIGS. 5 and 7. Accordingly, the tilted wall surface of the slide arm 32 functions to hold the restricting protrusion 31*c* of the swing handle 31 in the concave portion 32*a* in an ON state. In an OFF state, the tilted wall surface functions to uplift the top end of the restricting protrusion 31*c* of the swing handle 31 along the tilted wall surfaces in the sliding direction of the slide arm 32, thereby swinging the swing handle 31.

The slide arm 32 is fixed onto the upper surface of the permanent magnet 33, and the permanent magnet 33 is disposed slidably to left and right (in the ON direction and OFF direction) in FIGS. 5 and 7.

The left end surface of the permanent magnet 33 is disposed to face the end surface of the iron yoke 35. The coil 36 is wound around the yoke 35.

With this arrangement, the permanent magnet 33 moves toward the yoke 35 by virtue of its magnetic force, and is brought into tight contact with the yoke 35. By doing so, the permanent magnet 33 moves the slide arm 32 in the ON direction, and the swing handle 31 in the ON direction shown in FIGS. 5 and 6, thereby putting it into an ON state.

When energized, the coil 36 wound around the yoke 35 generates such a magnetic field as to magnetize the yoke 35 in such a direction as to reduce the magnetic force of the permanent magnet 33. Accordingly, the magnetic force of the permanent magnet 33 is reduced, and the swing handle 31 swings in the OFF direction (counterclockwise) by virtue of the pushing force of the return spring 34 and moves to the right (the OFF direction) in FIGS. 5 and 7. Here, a predetermined gap X shown in FIG. 7 is made between the yoke 35 and the permanent magnet 33.

Meanwhile, as shown in FIGS. 6 and 8, the swing handle 31 has a swinging movement keeping unit 31 that holds and interlocks a swing knob portion 37*a* of the switching member 37 to the swinging movement of the swing handle 31. Thus, the switching member 37 is swung in the opposite direction to the swing direction of the swing handle 31.

In short, the switching member 37 is swingably supported by a supporting end 38 *a* of the input-side fixed contact member 38 that is connected to the input-side fixed terminal 10*a* shown in FIGS. 2 and 3. Thus, the switching member 37 is electrically connected to the input-side fixed contact member 38. Further, the swing knob portion 37*a* is formed above the supporting position supported by the supporting end 38 *a*. The swinging movement keeping portion 31*d* of the swing handle 31 is disposed to hold the swing knob portion 37*a*.

Also, the switching member 37 has a movable contact 37*b* on the lower surface of its top end on the opposite side from the input-side fixed contact member 38. The output-side fixed contact member 39 has a fixed contact 39*a* at the location facing the movable contact 37*b*.

Accordingly, when the swing handle 31 swings or tilts clockwise (in the ON direction), the switching member 37 connected to the input-side fixed contact member 38 is swung counterclockwise by the swinging movement keeping portion 31*d* of the swing handle 31 via the swing knob portion 37*a*, as shown in FIG. 6. The movable contact 37*b* of the switching member 37 is then brought into contact with the fixed contact 39*a* of the output-side fixed contact member 39, so that the input-side fixed contact member 38 is brought into contact with the output-side fixed contact member 39.

When the swing handle 31 swings counterclockwise (in the OFF direction), the switching member 37 is swung clockwise by the swinging movement keeping portion 31*d* of the swing handle 31 via the swing knob portion 37*a*, as shown in FIG. 8. The movable contact 37*b* of the switching member 37 is then separated from the fixed contact 39*a* of the output-side fixed contact member 39, so that the connection between the input-side fixed contact member 38 and the output-side fixed contact member 39 is shut off.

The switching mechanism unit 4 has the coil 36 connected to the switch control circuit 23 and the power supply circuit 24 of the switch drive control circuit 8 shown in FIG. 4, so that energization of the coil 36 is controlled by the switch control circuit 23.

With this arrangement, in the switching mechanism unit 4, the slide arm 32 is held in the ON direction by virtue of the magnetic force of the permanent magnet 33, and the swing handle 31 is swingably held in the ON direction, so as to put it in an ON state. However, when the coil 36 is energized, a magnetic field is generated to magnetize the yoke 35 in such a direction as to reduce the magnetic force of the permanent magnet 33. As the magnetic force of the permanent magnet 33 is reduced, the suction force with the yoke 35 is also weakened. As a result, the swing handle 31 is swung in the OFF direction (counterclockwise) by virtue of the pushing force of the return spring 34. As the swing handle 31 swings in the OFF direction (counterclockwise), the switching member 37 swings clockwise. The movable contact 37*b* of the switching member 37 is then separated from the fixed contact 39*a* of the output-side fixed contact member 39, and the connection between the input-side fixed contact member 38 and the output-side fixed contact member 39 is shut off.

However, in an ON state in which the restricting protrusion 31*c* of the swing handle 31 enters the concave portion 32*a* of the slide arm 32 and the permanent magnet 33 is in tight contact with the yoke 35, the yoke 35 is sucked by greater magnetic force than the pushing force of the return spring 34 pushing the arm 31*a* of the swing handle 31 in the opening direction (OFF direction). Accordingly, even though the arm 31*a* is pushed in the opening direction (OFF direction) by the return spring 34 in an ON state, the swing handle 31 stably maintains the ON state in which the restricting protrusion 31*c* of the swing handle 31 is inserted into the concave portion 32*a* of the slide arm 32 by virtue of the magnetic force of the permanent magnet 33.

Also, when the switching device 1 is put into an ON state, the upper surface portion of the arm 31*a* of the swing handle 31 is manually pushed. Here, the magnetic force of the permanent magnet 33 acts in such a direction as to swing the swing handle 31 in the ON direction. Accordingly, the switching device 1 can be readily put into an ON state by lightly handling the swing handle 31.

The switching mechanism unit 4 is detachably attached onto the substrate 2 shown in FIGS. 1 through 3. As the switching mechanism unit 4 is attached onto the substrate 2, the input-side fixed contact member 38 is connected to the input-side fixed terminal 10*a* fixed onto the substrate 2, and the output-side fixed contact member 39 is connected to the output-side fixed terminal 10*b* fixed onto the substrate 2.

Next, the functions of the first embodiment are described. In the main housing 101 of the printer 100 shown in FIG. 9, the switching device 1 has the input connecting terminals 3, the switching mechanism unit 4, the leakage detecting current transformer 5, the output connecting terminals 6, the electric line members 7, and the switch drive control circuit 8, which are disposed on the same surface of the substrate 2 in an open state. With this arrangement, heat can be efficiently generated, as the printer 100 that is an electric apparatus operates and the switching device 1 operates.

In the following, explanation is made as to an ON state of the switching device 1, a transition state from an ON state to an OFF state, and a transition state from an OFF state to an ON state.

<ON State>

The switching device 1 has the input connecting terminals 3 connected to a commercial power supply line supplied to the printer 100 from the outside. Meanwhile, the switching device 1 has the output connecting terminals 6 connected to the power supply line that is connected to the power supply unit of the printer 100.

In the switching device 1 in an ON state shown in FIGS. 5 and 6, the movable contact 37*b* of the switching member 37 connected to the input-side fixed contact member 38 of the switching mechanism unit 4 is in contact with the fixed contact 39*a* of the output-side fixed contact member 39. The external commercial power of 100 V flows in the order of the input connecting terminals 3, the connecting piece 11*a*, the fixed terminal 10*a*, the switching mechanism unit 4, the fixed terminal 10*b*, the connecting piece 11*b*, the electric cable members 7 penetrating the leakage detecting current transformer 5, the connecting piece 12, and the output connecting terminals 6 shown in FIG. 2. The electric power flowing through the switching device 1 is supplied to the power supply unit (the device power supply unit) of the printer 100 through the power supply lines connected to the output connecting terminals 6.

Since the permanent magnet 33 is in tight contact with the yoke 35 by virtue of its magnetic force in an ON state, the switching mechanism unit 4 has the swing handle 31 swinging and tilting clockwise about the shaft 40. The restricting protrusion 31*c* of the swing handle 31 enters the concave portion 32*a* of the slide arm 32 fixed onto the permanent magnet 33. The arm 31*a* of the swing handle 31 then pushes the return spring 34 down.

In the switching device 1 in the ON state, the power supply circuit 24, to which AC power is supplied through the power supply line at least on the downstream side of the leakage detecting current transformer 5, rectifies the alternating current and adjusts the voltage, so as to supply necessary power to the amplifier circuit 21, the leakage determining circuit 22, and the switch control circuit 23. Also, operating power is supplied to the switching mechanism unit 4 to perform leakage detection and control operations.

<ON State→OFF State>

When leakage is caused in a circuit of the printer 100 including the switching device 1 in an ON state, unbalanced voltage is induced in the leakage detecting current transformer 5 of the switching device 1, and voltage is generated in the secondary coil 13 and is input as leakage detection voltage to the amplifier circuit 21.

The amplifier circuit 21 amplifies the leakage detection voltage detected in the secondary coil 13, and outputs the amplified voltage to the leakage determining circuit 22. The leakage determining circuit 22 compares the leakage detection voltage, which is input from the amplifier circuit 21, with the predetermined comparative voltage. If the leakage detection voltage exceeds the predetermined leakage level, the leakage determining circuit 22 outputs a leakage detection signal to the switch control circuit 23.

In the ON state, the switch control circuit 23 shuts off the supply of the opening operation power from the power supply circuit 24 to the switching mechanism unit 4, so that the switching mechanism unit 4 closes the power supply lines and electric power is supplied from an external power source to the power supply unit of the printer 100. As the leakage detection signal is input from the leakage determining circuit 22, the opening operation power is supplied from the power supply circuit 24 to the switching mechanism unit 4. The switching mechanism unit 4 then opens the power supply lines, so that the power supply to the circuits beyond the switching mechanism unit 4 is shut off.

As the opening operation power is supplied from the power supply circuit 24 to the coil 36 in the switching mechanism unit 4, the coil 36 generates a magnetic field in such a direction as to magnetize the yoke 35 to reduce the magnetic force of the permanent magnet 33. As the magnetic force of the permanent magnet 33 is reduced, the swing handle 31 is allowed to swing in the OFF direction (counterclockwise) by virtue of the pushing force of the return spring 34, as shown in FIG. 7. The permanent magnet 33 then moves apart from the yoke 35, and the predetermined gap X is made between the yoke 35 and the permanent magnet 33.

As the swing handle 31 swings in the OFF direction, the switching member 37 is swung clockwise by the swinging movement keeping portion 31*d* of the swing handle 31 via the swing knob portion 37*a*. As shown in FIG. 8, the movable contact 37*b* of the switching member 37 then moves apart from the fixed contact 39*a* of the output-side fixed contact member 39, and the connection between the input-side fixed contact member 38 and the output-side fixed contact member 39 is cut off.

The switching mechanism unit 4 of the switching device 1 is activated by supplying AC power as its operating power to the power supply circuit 24 through the power supply lines at least on the downstream side of the leakage detecting current transformer 5, for example, through the output connecting terminals 6. Therefore, leakage is detected in the entire switching device 1. When leakage is detected and the connection with the input connecting terminals 3 and the output connecting terminals is shut off, the power supply to the switching device 1 is also shut off.

Even if leakage is caused in the switching device 1, the power supply to the switching device 1 is also shut off, as described above. Thus, trouble due to leakage can be avoided.

<Off State→On State>

After leakage is detected and the power supply is cut off as described above, the leakage is eliminated, and the power supply from an external power source to the switching device 1 is resumed. Thus, the printer 100 can be used again. As indicated by the arrow showing the manual operation in FIG. 7, the upper surface of the arm 31*a* of the swing handle 31 is pushed down, and the slide arm 32 and the permanent magnet 33 in tight contact with the slide arm 32 are moved toward the yoke 35. As the permanent magnet 33 approaches the yoke 35, the suction force of the permanent magnet 33 to the yoke 35 becomes greater. Even if the pushing force acting on the upper surface of the arm 31*a* of the swing handle 31 is small, the swing handle 31 can be readily swung from an OFF state into an ON state.

As the permanent magnet 33 is brought into tight contact with the yoke 35 in the ON state shown in FIG. 5, the switching member 37 swings in the ON direction in conjunction with the swinging movement of the swing handle 31, as shown in FIG. 6. The movable contact 37*b* of the switching member 37 is then brought into contact with the fixed contact 39*a* of the output-side fixed contact member 39, and the input-side fixed contact member 38 is connected to the output-side fixed contact member 39.

As described above, the swing handle 31 of the first embodiment is pushed in toward the OFF position by the return spring 34, and the swing handle 31 moves the switching member 37, which connects to or shuts the power supply lines, between the ON position and the OFF position. The permanent magnet 33 moves the swing handle 31 between the ON position and the OFF position. The permanent magnet 33 holds the ON state by virtue of its magnetic force by which the permanent magnet 33 stays in tight contact with the yoke 35 around which the coil 36 is wound. When the coil 36 is energized, a magnetic field is generated to magnetize the yoke 35 in such a manner as to reduce the magnetic force of the permanent magnet 33. The swing handle 31 and the switching member 37 are then moved from the ON position to the OFF position by virtue of the pushing force of the return spring 34, so that the power supply lines are shut.

Accordingly, the swing handle 31 can be moved in the ON direction with small operating force. Thus, usability can be increased, while s stable switching operation is maintained.

Also, in the switching device 1 of the first embodiment, the switching mechanism unit 4 is disposed on the power supply line between the external power source introducing outlet of the housing 101 and the device power supply unit of the printer 100 as an electric apparatus. When the leakage detecting current transformer 5, the secondary coil 13, the amplifier circuit 21, and the leakage determining circuit 22, which function as a leakage detecting unit, detect leakage in an internal circuit of the printer 100, the coil 36 is energized to shut the power supply line, so that the external power supply to the device power supply unit is cut off. As the switching device 1 is housed as a leakage detection control device in the housing 101 of the printer 100, a simple structure with excellent air flow can be realized. Also, excellent cooling capability can be achieved, and the printer 100 can be made smaller and less expensive. Further, the swing handle 31 located in the housing 101 of the printer 100 can be moved in the ON direction with small operating force, and accordingly, leakage detection and open/close control on the power supply line can be stably performed. Thus, higher usability can be achieved.

In this switching device 1, the operating power is supplied through the power supply line at least on the downstream side of the leakage detecting current transformer 5. Accordingly, leakage in the switching device 1 can be detected, and the external power supply can be controlled. Thus, even greater safety can be achieved.

Also, in the switching device 1 of this embodiment, the switching mechanism unit 4 and the switch drive control circuit 8 are disposed on the same surface of the substrate 2. Accordingly, a smaller structure can be realized, and higher productivity can be achieved. Further, higher switching accuracy and greater safety can be achieved.

In the switching device 1 of this embodiment, the switching mechanism unit 4 is detachably mounted onto the substrate 2. When the switching mechanism unit 4 deteriorates, it can be readily replaced with a new one. Accordingly, higher reliability can be achieved. Also, higher switching accuracy and greater safety can be achieved.

It should be noted that the operating member is not limited to the swing handle 31 in the present invention, but a slide or push operator may be employed if the structure of the switching mechanism unit 4 is modified.

Second Embodiment

Figure 10:
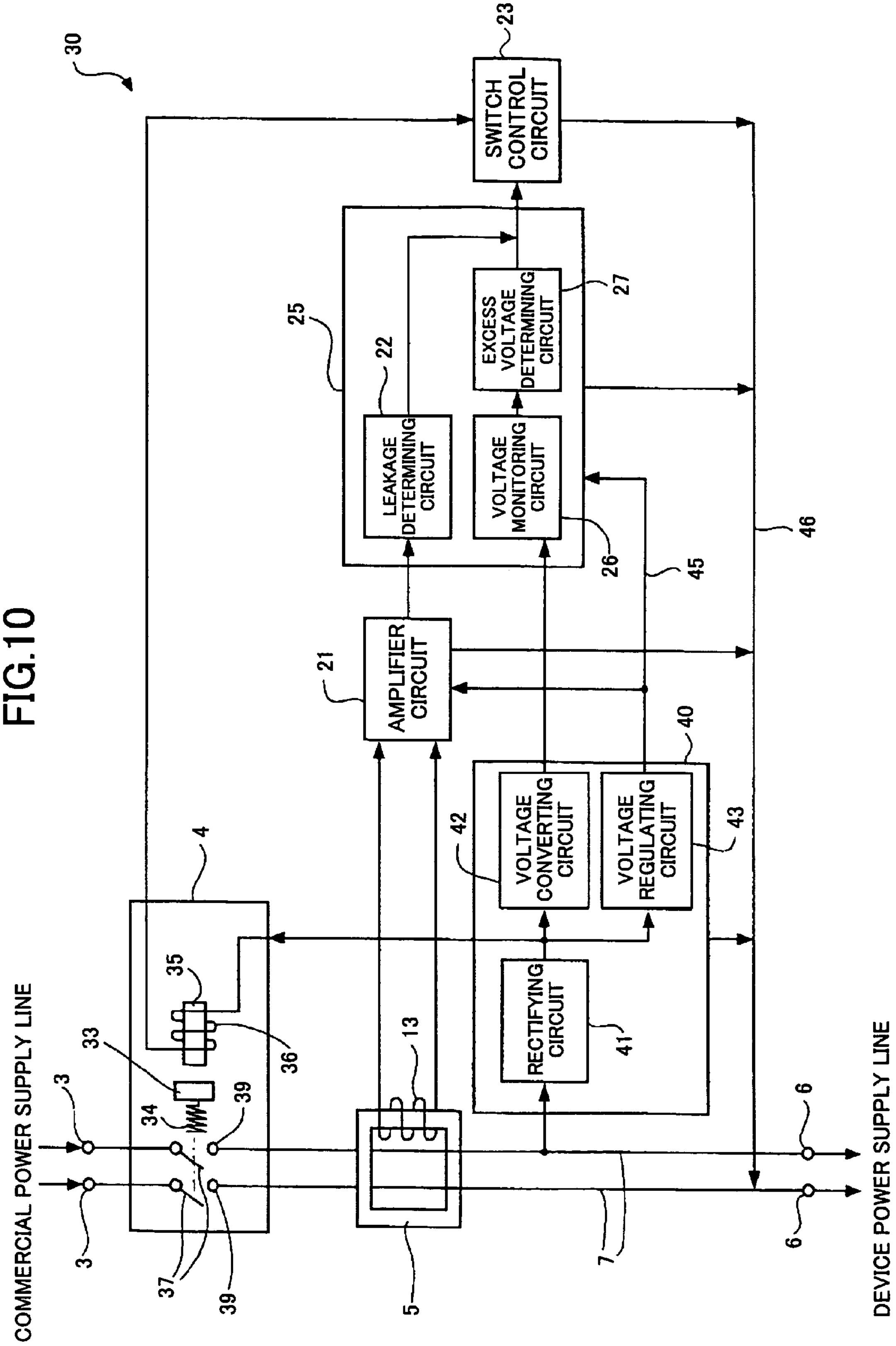
FIG. 10 is a circuit diagram of a second embodiment of a switching device in accordance with the present invention.

Referring now to FIGS. 10 through 16, a second embodiment of a switching device and an electric apparatus in accordance with the present invention is described. FIG. 10 is a circuit diagram of the switching device of the second embedment. The switching device 30 of this embodiment is the same as the switching device 1 of the first embodiment, except for the component equivalent to the switch drive control circuit 8 shown in FIG. 4. Accordingly, the structure including the switching mechanism unit 4 and the leakage detecting current transformer 5 illustrated in FIGS. 1 through 3 and FIGS. 5 through 8 is the same as that of the first embodiment. In FIG. 10, the same components as those shown in FIG. 4 are denoted by the same reference numerals as those in FIG. 4.

As shown in FIG. 10, the switching device 30 of the second embodiment includes the switching mechanism unit 4, the leakage detecting current transformer 5, the amplifier circuit 21, and the switch control circuit 23 that are the same as those of the first embodiment. The switching device 30 further includes a control block 25 and a power supply block 40 that differ from the components of the first embodiment. The control block 25 has the leakage determining circuit 22, a voltage monitoring circuit 26, and an excess voltage determining circuit 27 that are collectively formed in one module. The power supply block 40 includes a rectifying circuit 41, a voltage converting circuit 42, and a voltage regulating circuit 43.

The switching mechanism unit 4 opens and closes the connection between the output-side fixed contact member 39 and the switching member 37 so as to shut or open the feed line (the power supply line) formed by the two electric cable members 7 that supply the alternating current input from a commercial power supply line to the input connecting terminals 3 to the power supply line of an electric apparatus such as the printer 100 shown in FIG. 9 through the output connecting terminals 6.

The leakage detecting current transformer 5 is located so that the electric cable members 7 penetrate its core. When leakage is caused, voltage is generated in the secondary coil (a detecting coil) 13. After amplifying the voltage generated in the secondary coil 13, the amplifier circuit 21 outputs the amplified voltage to the leakage determining circuit 22 of the control block 25.

When the voltage input from the amplifier circuit 21 exceeds a predetermined leakage determining value, the leakage determining circuit 22 outputs a pulse signal as a leakage detection signal to the switch control circuit 23. Accordingly, the leakage detecting current transformer 5, the amplifier circuit 21, and the leakage determining circuit 22 constitute the leakage detecting unit.

The control block 25 includes the voltage monitoring circuit 26 and the excess voltage determining circuit 27, as well as the leakage determining circuit 22. The power supply block 40 is described below before the control block 25 is described in detail.

The rectifying circuit 41 of the power supply block 40 receives AC power from a commercial power supply line and supplies rectified pulsating voltage to the internal voltage converting circuit 42, the voltage regulating circuit 43, and the switching mechanism unit 4. The voltage regulating circuit 43 smoothes and regulates the pulsating voltage supplied from the rectifying circuit 41. The voltage regulating circuit 43 then supplies DC constant voltage regulated power to the amplifier circuit 21 and each circuit in the control block 25 through a supply line 45. The voltage converting circuit 42 converts the pulsating voltage supplied from the rectifying circuit 41 into lower voltage, and then outputs the pulsating voltage to the voltage monitoring circuit 26 of the control block 25 without the use of a smoothing capacitor.

The voltage monitoring circuit 26 receives the pulsating voltage from the voltage converting circuit 42, and analog-to-digital converts the pulsating voltage into a code. The coded voltage value is output to the excess voltage determining circuit 27. In the excess voltage determining circuit 27, reference information for determining excess voltage, including a numerical value for determining excess voltage, acceptable values, and a determining timing adjusting value, is preset and written on a ROM, for example. The input voltage value is compared with the reference numerical values for determining excess voltage. If the input voltage value excesses the preset excess voltage value, a pulse signal is output as an excess voltage detection signal to the switch control circuit 23.

Receiving a pulse signal from the leakage determining circuit 22 or the excess voltage determining circuit 27, the switch control circuit 23 energizes the coil 36 wound around the yoke 35 of the switching mechanism unit 4.

The return line 46 shown in FIG. 10 is to supply a zero potential to each circuit. The arrows attached to the lines of the circuits shown in FIG. 10 indicate the flow of operating current, all of which returns to the return line 46.

Figure 11A:
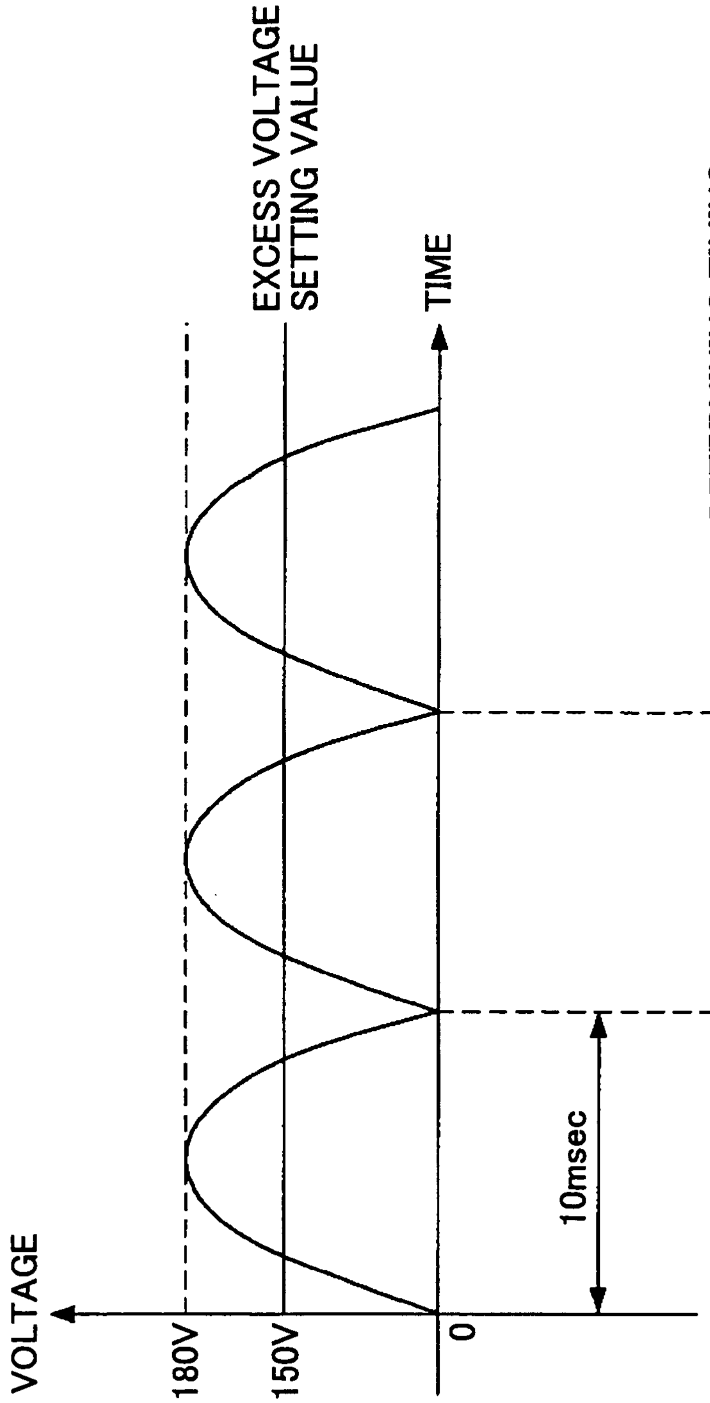
FIGS. 11A and 11B are timing charts illustrating the relationship between the waveform of the full-wave rectified voltage from the rectifying circuit shown in FIG. 10 and the determining timing of the excess voltage determining circuit.
Figure 11B:
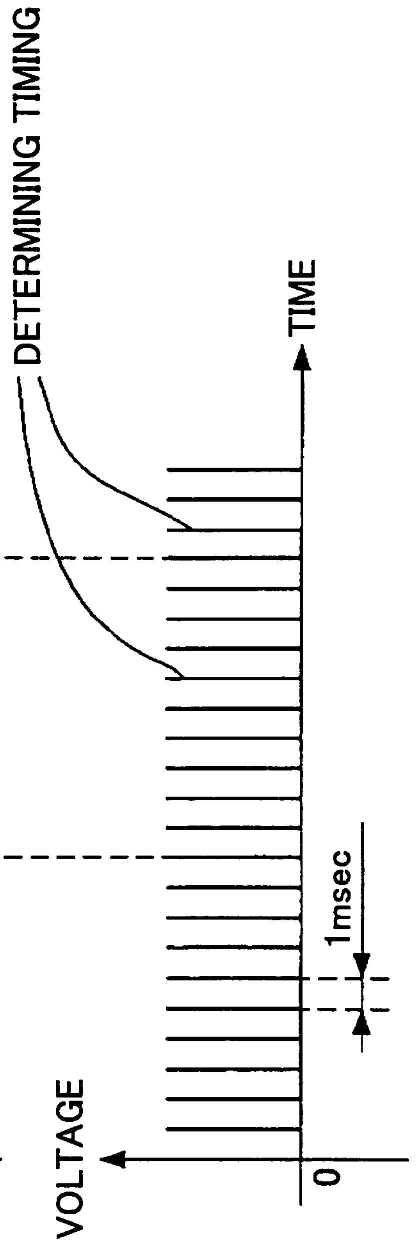

FIGS. 11A and 11B are timing charts showing the relationship between the full-wave rectified waveform that is output from the rectifying circuit 41 and the determining timing of the excess voltage determining circuit 27.

FIG. 11A shows the voltage waveform that is input from a commercial power supply line to the rectifying circuit 41 shown in FIG. 10, is full-wave rectified, and is output to the voltage converting circuit 42 and the voltage regulating circuit 43. In the graph of FIG. 11A, the ordinate axis indicates the voltage, and the abscissa axis indicates the time. The voltage value is merely an example value, while the graph shows the relationship in the case where the crest value of the output voltage of the rectifying circuit 41 is 180 V, and the excess voltage setting value set in the excess voltage determining circuit 27 is 150 V. The time 10 ms indicating the cycle of the pulsating voltage indicates a case where the frequency of the alternating current of the commercial power supply line is 50 Hz.

The reference voltage value for determining excess voltage varies with the type of the power source of the electric apparatus, but the upper limit value may be set at 40% of the tolerable peak value, for example.

Also, in the case of AC input voltage, the timing for determining excess voltage is preferably set so as to perform a determining operation on a shorter cycle than a ¼ cycle of the input voltage. However, as the cycle of the determining operation becomes shorter, the processing speed becomes lower.

Figure 16:
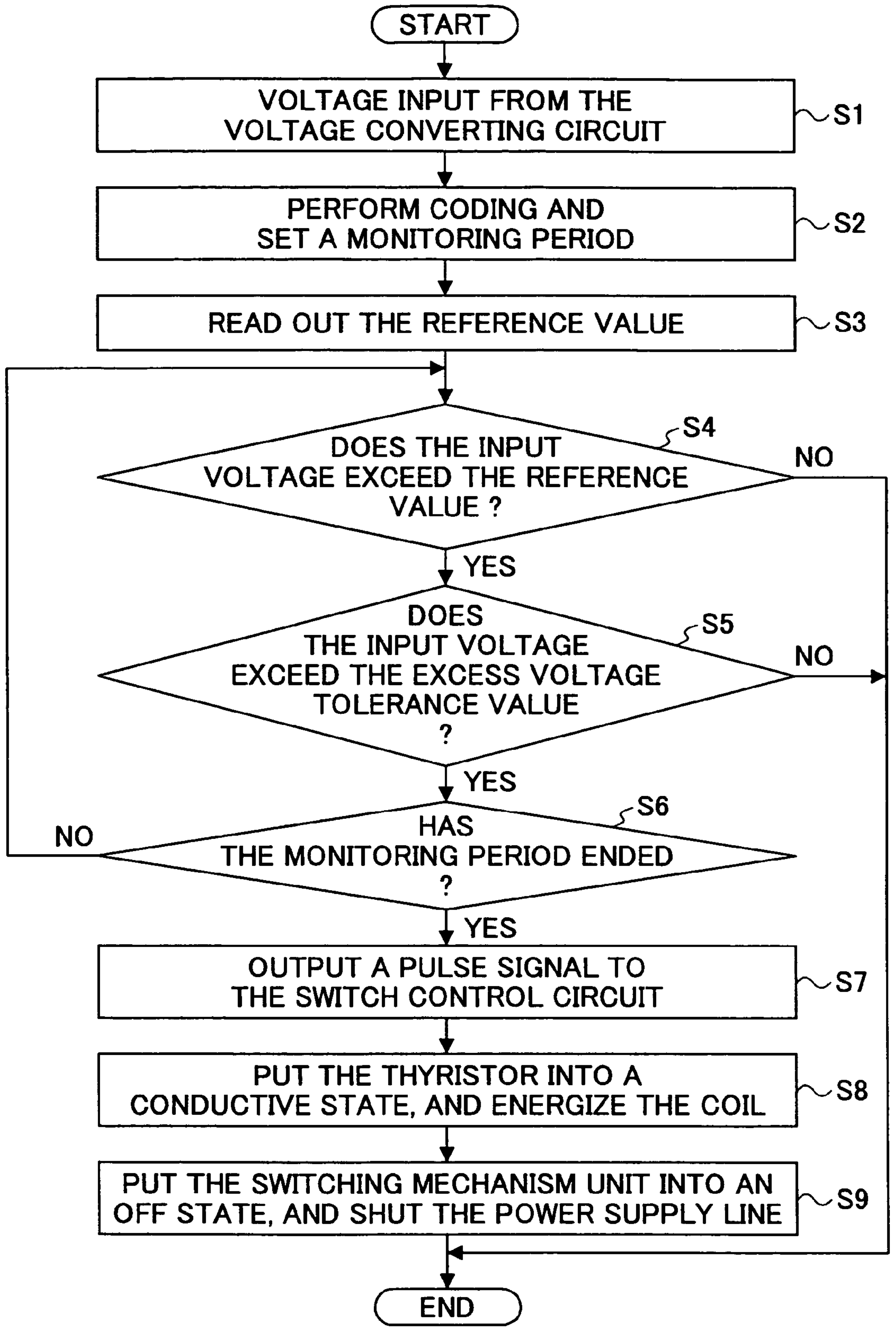
FIG. 16 is a flowchart of the excess voltage monitoring operation in accordance with the second embodiment of the present invention.

The determining timing of the excess voltage determining circuit 27 is determined by the processing speed of the control block 25. In a case where a microprocessor is used for the control block 25, the operation shown in the flowchart of FIG. 16 is set as one processing cycle. When the input of the voltage monitoring circuit 26 exceeds 0V, the operation starts, and the operation is repeated to set the timing for determining excess voltage. FIG. 11B shows an example of the timing for determining excess voltage. In this example, half a cycle of the input AC voltage is 10 ms (in the case of a 50-cycle AC power supply), and the cycle of the determining timing is set at approximately 1 ms.

The processing time varies depending on the processing contents. An adjustment value may be set so that the processing can be completed within 1 ms. In such a case, the determining operation can be performed ten times in half a cycle of a commercial power supply (10 ms in the case of 50 Hz). The determining timing and the determining method vary with the required type of the power source, and therefore, they are not limited to the above example.

Figure 12:
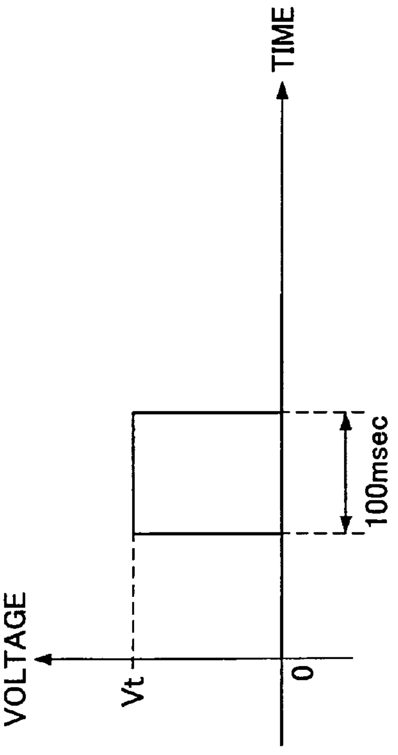
FIG. 12 is a waveform chart illustrating an example of a pulse signal that is output from the leakage determining circuit or the excess voltage determining circuit shown in FIG. 10.

FIG. 12 shows an example of the waveform of a pulse signal (a trigger pulse) that is output from the leakage determining circuit 22 or the excess voltage determining circuit 27 of the control block 25. With this pulse signal, a trigger voltage Vt is output to the switch control circuit 23 for a predetermined period of time, for example, 100 ms. In this example, the signal is in the form of a pulse signal, but the signal of the trigger voltage Vt may be directly output.

Figure 13:
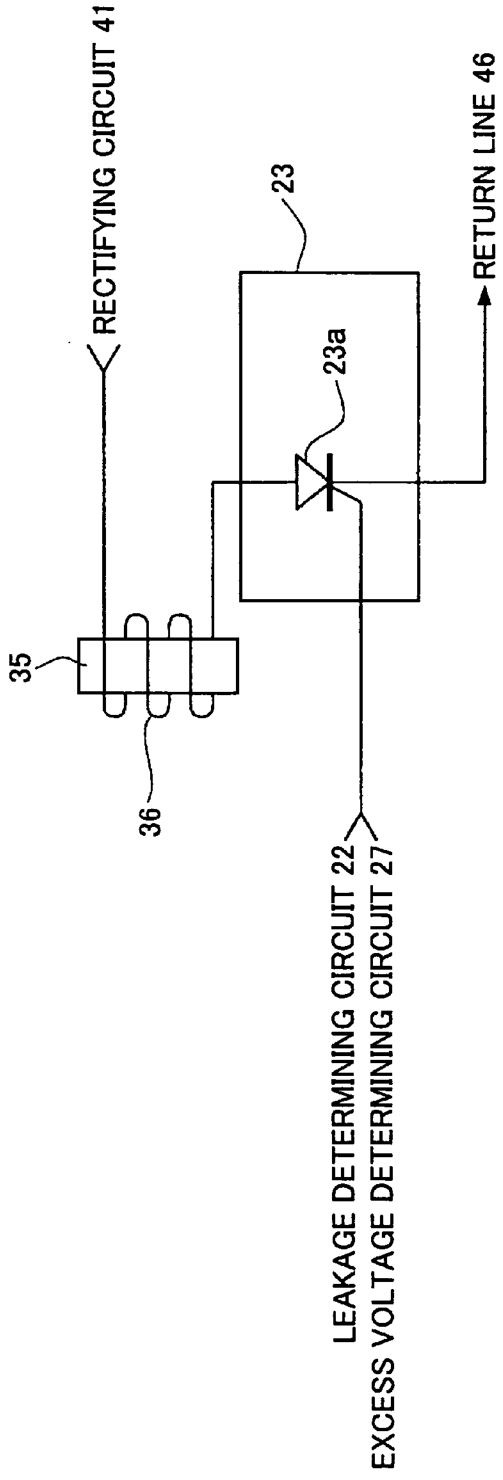
FIG. 13 is a circuit diagram illustrating an example of the switch control circuit shown in FIG. 10, together with the yoke around which the coil is wound.

FIG. 13 illustrates an example of the switch control circuit 23, together with the yoke 35 around which the coil 36 is wound. A full-wave rectified voltage that is output from the rectifying circuit 41 is input to one of the ends of the coil 36. The other end of the coil 36 is connected to the switch control circuit 23.

The switch control circuit 23 has a thyristor 23*a* as a switching element. In this example, a thyristor is used as a switching element, but it is possible to employ another type of switching element, such as a transistor. The anode terminal of the thyristor 23*a* is connected to the other end of the coil 36, and the cathode terminal of the thyristor 23*a* is connected to the return line 46. Further, the gate terminal of the thyristor 23*a* is connected to the output terminals of the leakage determining circuit 22 and the excess voltage determining circuit 27 of the control block 25.

A pulse signal is output as a leakage detection signal or an excess voltage detection signal from the leakage determining circuit 22 or the excess voltage determining circuit 27 of the control block 25. As the pulse signal is input to the gate of the thyristor 23*a*, the thyristor 23*a* becomes conductive. As a result, a current path that runs from the rectifying circuit 41 to the coil 36, to the thyristor 23*a*, and then to the return line 46, is formed in the switching mechanism unit 4, and the coil 36 is energized.

As the coil 36 is energized, such a magnetic field as to reduce the magnetic force of the permanent magnet 33 shown in FIG. 5 is generated in the yoke 35. The swing handle 31 and the switching member 37 shown in FIG. 6 is moved from the ON position to the OFF position by virtue of the pushing force of the return spring 34. The connection between the switching member 37 and the output-side fixed contact member 39 is released as shown in FIG. 8, and the connection between the commercial power supply line and the device power supply line formed by the electric cable members 7 shown in FIG. 10 is cut off.

As the power supply line is cut off, the AC power supply from the commercial power supply line to the rectifying circuit 41 is stopped, and the voltage supply to the coil 36 is also cut off. The thyristor 23*a* of the switch control circuit 23 is turned off, accordingly.

Here, the power supply to the power supply block 40, the control block 25, and the switching mechanism unit 4, is also cut off. Thus, the switching device 30 and the entire electric apparatus to which power is supplied via the switching device 30 can be protected from leakage and excess voltage.

The switching device 30 can maintain the above state, unless the swing handle 31 shown in FIG. 7 is pushed by hand. Thus, greater safety can be achieved, compared with a case where a short-circuit relay is constantly used.

Figure 14:
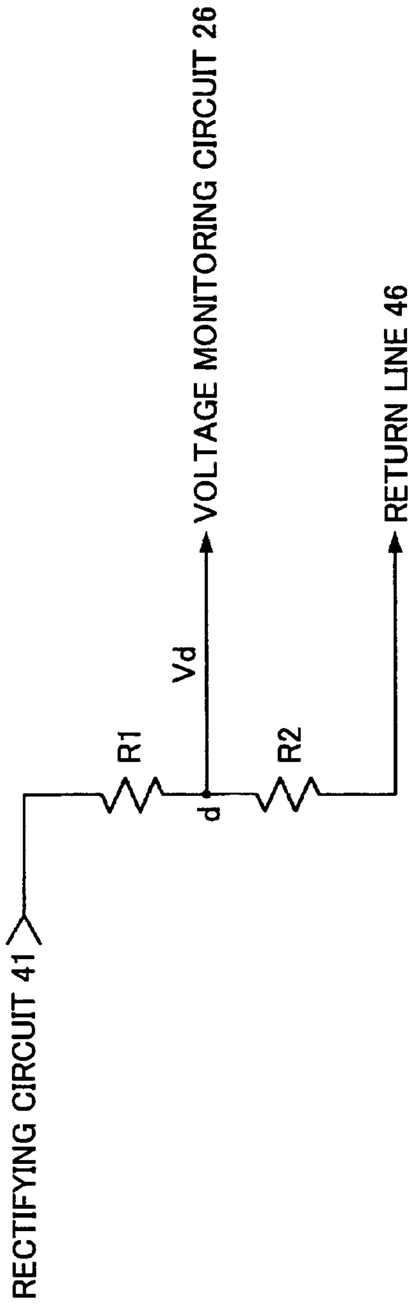
FIG. 14 illustrates a specific example of the voltage converting circuit shown in FIG. 10.
Figure 15:
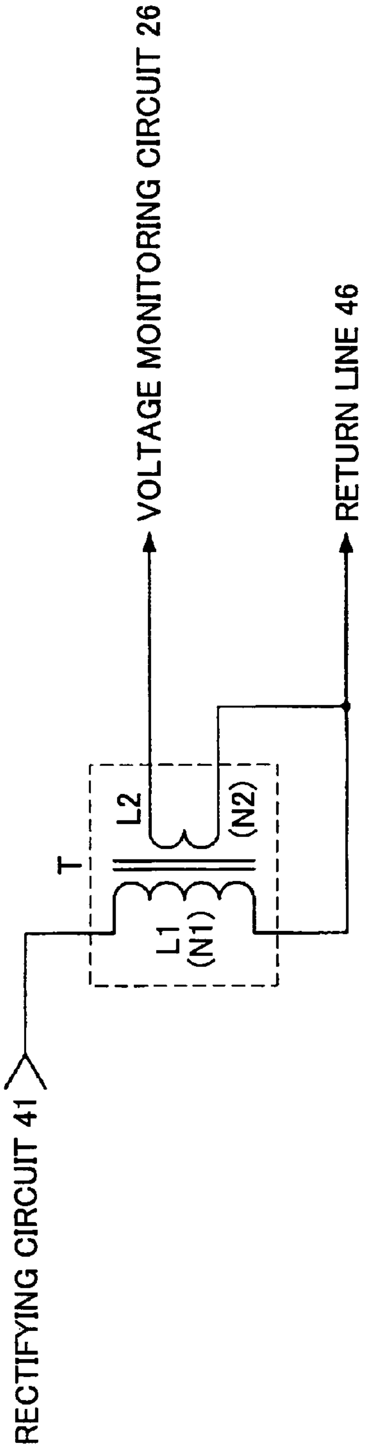
FIG. 15 illustrates another specific example of the voltage converting circuit shown in FIG. 10.

FIGS. 14 and 15 illustrate examples of the voltage converting circuit 42.

FIG. 14 shows an example structure that includes a resistance voltage dividing circuit. In this structure, resistances R1 and R2 are connected in series between the output terminal of the rectifying circuit 41 and the return line 46, and the voltage dividing point d is connected to the input terminal of the voltage monitoring circuit 26. If the resistance ratio of the resistance R1 to the resistance R2 is 1000:1, a monitoring voltage Vd obtained by dividing the pulsating voltage by approximately 1000 is output to the voltage dividing point d, and is then input to the voltage monitoring circuit 26. Here, the pulsating voltage is formed by full-wave rectifying the AC power that is supplied through the commercial power supply line and is output from the rectifying circuit 41.

With the resistance values of the resistances R1 and R2 being R1 and R2, the monitoring voltage Vd can be obtained from the following equation:

$$Vd=(\text{full-wave rectified voltage})\times\{R2/(R1+R2)\}$$

Here, if R1 is 1000 KΩ and R2 is 1 KΩ, the monitoring voltage Vd is (rectified voltage)×1/(1+1000), which is a value divided by approximately 1000.

Since the full-wave rectified voltage of a commercial power source that is output from the rectifying circuit 41 is too high to be input to the control block 25 consisting of electronic circuits, it is desirable to lower the voltage to 1/1000 or so.

FIG. 15 illustrates another example structure of the voltage converting circuit 42. In this structure, an insulating transformer T that includes a primary coil L1 and a secondary coil L2 is employed. One of the terminals of the primary coil L1 of the insulating transformer T is connected to the output terminal of the rectifying circuit 41, and the other terminal of the primary coil L1 is connected to the return line 46. Meanwhile, one of the terminals of the secondary coil L2 is connected to the input terminal of the voltage monitoring circuit 26, and the other terminal of the secondary coil L2 is connected to the return line 46. As the ratio of the winding number N1 of the primary coil L1 to the winding number N2 of the secondary coil L2 is set at approximately 1000:1, a pulsating voltage that is approximately 1/1000 of the pulsating voltage applied to the primary coil L1 is induced in the secondary coil L2, and that is input as the monitoring voltage to the voltage monitoring circuit 26. In this manner, with the insulating transformer T, output voltage that is formed by arbitrarily reducing the input voltage can be obtained, while insulation from the input side is maintained.

Referring now to the flowchart of FIG. 16, the operation of the control block 25 illustrated in FIG. 10 is described. The control block 25 may be formed with a microprocessor.

Once power is supplied to the electric apparatus, the control block 25 starts the operation shown in FIG. 16. In step S1, voltage is input from the voltage converting circuit 42 to the voltage monitoring circuit 26.

In step S2, the voltage monitoring circuit 26 analog-to-digital converts the input voltage into a code, and sets monitoring timing or determining timing and sends the timing to the excess voltage determining circuit 27.

In step S3, the excess voltage determining circuit 27 reads the voltage value of a predetermined reference voltage, and compares the input voltage with the reference voltage value to determine whether the input voltage exceeds the reference value in step S4. If the input voltage does not exceed the reference voltage value, the operation comes to an end. If the input voltage exceeds the reference voltage value, the excess voltage determining circuit 27 determines whether the input voltage exceeds an excess voltage tolerance value in step S5. If the input voltage does not exceed the excess voltage tolerance value, the operation comes to an end. If the input voltage exceeds the excess voltage tolerance value, the excess voltage determining circuit 27 determines whether the monitoring time has passed in step S6.

If the monitoring time has not passed yet, the operation returns to step S4, and the procedures of steps S4 through S6 are repeated. If the monitoring time has passed, the operation moves on to step S7, in which the excess voltage determining circuit 27 outputs a pulse signal as an excess voltage determination trigger pulse to the switch control circuit 23.

In step S8, the switch control circuit 23 puts the thyristor 23*a* in a conducted state. By doing so, the coil 36 of the switching mechanism unit 4 is energized, and the switching mechanism unit 4 is put into an OFF state. The power supply line of the electric apparatus is then shut, and the operation comes to an end.

In the second embodiment, the same modification as described in the first embodiment can be made. In the case where the switching device is mounted onto an electric apparatus, the same conditions as in the first embodiment are applied to the second embodiment.

It should be noted that the present invention is not limited to the embodiments specifically disclosed above, but other variations and modifications may be made without departing from the scope of the present invention.

This patent application is based on Japanese Priority Patent Application Nos. 2004-141245, filed on May 11, 2004, and 2005-036998, filed on Feb. 14, 2005, the entire contents of which are hereby incorporated by reference.

What is claimed is:

1. An electric apparatus comprising:

a switching device, including a switch drive control unit; and a switching mechanism unit, including:

a yoke around which a coil is wound, an operating member that is manually movable by a person to an ON position and to an OFF position, a permanent magnet that is movable between the ON position and the OFF position, the permanent magnet being in contact with or in the vicinity of the yoke when the operating member is at the ON position, and being separated from the yoke when the operating member is at the OFF position, a switching member that connects and disconnects a power feed line when the operating member is at the ON position or the OFF position, and a biasing unit that urges the operating member toward the OFF position, wherein:

the operating member is held at the ON position by an attractive force of the permanent magnet and the yoke against the urging force of the biasing unit when the permanent magnet is at the ON position, the yoke is magnetized to reduce magnetic force of the permanent magnet when the coil is energized by the switch drive control unit, and the operating member and the switching member are moved from the ON position to the OFF position by the urging force of the biasing unit, thereby disconnecting the power feed line, the electric apparatus further including:

an external power supply introducing outlet being formed on a housing of the electric apparatus, a device power supply unit being provided to generate operating power from power supplied from an external power source and to supply the operating power to various internal circuits, a power supply line between the external power supply introducing outlet and the device power supply unit being the feed line, the switching mechanism unit being disposed on the power supply line, the switch drive control unit comprising at least a leakage detecting unit that determines whether there is leakage due to the feed line or a load that is fed via the feed line, the switch drive control unit energizing the coil so as to disconnect the feed line, when the leakage detecting unit detects leakage.

2. The electric apparatus as claimed in claim 1, wherein:

the switch drive control unit further comprises an excess voltage determining unit that monitors input voltage of the feed line and determines whether there is excess voltage based on a predetermined criterion; and when the excess voltage determining unit determines that there is excess voltage, the switch drive control unit energizes the coil so as to disconnect the feed line.

3. The electric apparatus as claimed in claim 2, wherein a leakage determining circuit of the leakage detecting unit and an excess voltage determining circuit of the excess voltage determining unit are disposed in a module of an integral control block.

4. The electric apparatus as claimed in claim 1, wherein the operating power of the switch drive control unit of the switching device is supplied through the power supply line on a downstream side of the leakage detecting unit.

5. The electric apparatus as claimed in claim 1, wherein the switching mechanism and the switch drive control unit of the switching device are disposed on the same surface of a substrate.

6. The electric apparatus as claimed in claim 5, wherein the switching mechanism unit of the switching device is detachably attached onto the substrate.

7. An electric apparatus comprising:

a switching device, including a switch drive control unit; and a switching mechanism unit, including:

a yoke around which a coil is wound, an operating member that is manually movable by a person to an ON position and to an OFF position, a permanent magnet that is movable between the ON position and the OFF position, the permanent magnet being in contact with or in the vicinity of the yoke when the operating member is at the ON position, and being separated from the yoke when the operating member is at the OFF position, a switching member that connects and disconnects a power feed line when the operating member is at the ON position or the OFF position, and a biasing unit that urges the operating member toward the OFF position, wherein:

the operating member is held at the ON position by an attractive force of the permanent magnet and the yoke against the urging force of the biasing unit when the permanent magnet is at the ON position, the yoke is magnetized to reduce magnetic force of the permanent magnet when the coil is energized by the switch drive control unit, and the operating member and the switching member are moved from the ON position to the OFF position by the urging force of the biasing unit, thereby disconnecting the power feed line, the electric apparatus further including:

an external power supply introducing outlet being formed on a housing of the electric apparatus, a device power supply unit being provided to generate operating power from power supplied from an external power source and to supply the operating power to various internal circuits, a power supply line between the external power supply introducing outlet and the device power supply unit being the feed line, the switching mechanism unit being disposed on the power supply line, the switch drive control unit comprising an excess voltage determining unit that monitors input voltage of the feed line and determines whether there is excess voltage based on a predetermined criterion, the switch drive control unit energizing the coil so as to disconnect the feed line, when the excess voltage determining unit determines that there is excess voltage.

8. The electric apparatus as claimed in claim 7, wherein the excess voltage determining unit of the switching device performs an excess voltage determining operation on a shorter cycle than a ¼ cycle of the input voltage of the feed line, when the input voltage is alternating voltage.

* * * * *